United States Patent [19]

Nickens et al.

[11] Patent Number: 5,819,815
[45] Date of Patent: Oct. 13, 1998

[54] APPARATUS AND METHOD FOR CONTROLLED PENETRATION OF COMPRESSED FLUID CYLINDERS

[75] Inventors: Dan A. Nickens, Windermere; Charles C. Mattern, Clermonte, both of Fla.

[73] Assignee: Earth Resources Corporation, Ocoee, Fla.

[21] Appl. No.: 769,394

[22] Filed: Dec. 19, 1996

Related U.S. Application Data

[62] Division of Ser. No. 570,478, Dec. 11, 1995, Pat. No. 5,613,534, which is a division of Ser. No. 245,912, May 24, 1994, Pat. No. 5,474,114, which is a continuation-in-part of Ser. No. 70,709, May 28, 1993, Pat. No. 5,427,157.

[51] Int. Cl.⁶ .................................................. B67B 7/46
[52] U.S. Cl. .............................. 141/51; 141/97; 222/87; 137/318; 29/403.1; 408/87
[58] Field of Search ..................... 141/51, 97; 408/1 R, 408/2, 7, 12, 87, 95–97; 137/317, 318; 222/87; 29/403.1, 403.3, 426.1, 426.4

[56] References Cited

U.S. PATENT DOCUMENTS

| Re. 33,799 | 1/1992 | Gold et al. ................................. 141/51 |
|---|---|---|
| 045,183 | 11/1864 | Sexton . |
| 314,085 | 3/1885 | Van Norman . |
| 572,786 | 12/1896 | Downey . |
| 884,565 | 4/1908 | Bryan ....................................... 408/87 |
| 2,231,448 | 2/1941 | Hooper ..................................... 137/318 |
| 2,756,486 | 7/1956 | Smith ........................................ 137/318 |
| 2,911,859 | 11/1959 | Longley et al. ......................... 408/1 R |
| 3,045,511 | 7/1962 | Risley ....................................... 137/318 |
| 3,364,939 | 1/1968 | Valenziano ............................. 408/1 R |
| 3,495,615 | 2/1970 | Ehrens et al. . |
| 3,821,965 | 7/1974 | Reynolds ................................. 137/318 |
| 3,974,846 | 8/1976 | Serota . |
| 3,983,756 | 10/1976 | Danguillier . |
| 3,993,221 | 11/1976 | Boynton et al. . |
| 3,995,655 | 12/1976 | Sands ....................................... 137/318 |
| 4,166,481 | 9/1979 | Farris et al. . |
| 4,349,054 | 9/1982 | Chipman et al. . |
| 4,350,052 | 9/1982 | Kendall . |
| 4,399,829 | 8/1983 | Schuler . |
| 4,475,566 | 10/1984 | Haines . |
| 4,690,180 | 9/1987 | Gold .......................................... 141/51 |
| 4,944,333 | 7/1990 | Gold et al. ................................ 141/51 |
| 4,966,317 | 10/1990 | Barr . |

(List continued on next page.)

FOREIGN PATENT DOCUMENTS

| 950614 | 9/1956 | Germany . |
|---|---|---|
| 1607991 | 10/1970 | Germany . |

OTHER PUBLICATIONS

Memo, New Jersey State Deportment of Environmental Protection, Feb. 4, 1982, two pages.

(List continued on next page.)

*Primary Examiner*—J. Casimer Jacyna
*Attorney, Agent, or Firm*—Hunton & Williams

[57] ABSTRACT

A drill assembly for penetrating a wall of a container is provided. The container is supported by a platform within a recovery vessel. The drilling assembly allows removal of a fluid from the container. The drilling assembly includes a tube for lining a first opening into the recovery vessel, as well as a first housing having an interior. A first adapter couples the housing to a first end of the tube to partially define a longitudinal bore. A shaft is rotatably disposed within the longitudinal bore. The shaft has one end for engagement with a drill bit with the other end for engagement with a motor. The drill bit is engaged to the shaft to penetrate the container wall, while the motor is engaged to the other end of the shaft. A first seal assembly forms a first fluid barrier between the interior and the longitudinal bore. Multiple seals may be formed between the first housing and the container. The container and the adapter may be integrally connected. Multiple drilling assemblies may be used and a drilling assembly may be configured to permit the introduction therethrough of a flushing fluid into the container.

14 Claims, 12 Drawing Sheets

U.S. PATENT DOCUMENTS

| | | |
|---|---|---|
| 5,035,269 | 7/1991 | Pytryga et al. . |
| 5,076,311 | 12/1991 | Marschke . |
| 5,114,043 | 5/1992 | Collins, Jr. . |
| 5,163,462 | 11/1992 | Leemput et al. . |
| 5,163,483 | 11/1992 | Eckman .................................. 141/51 |
| 5,174,344 | 12/1992 | Gonzalez-Miller et al. ............. 141/97 |
| 5,186,219 | 2/1993 | Gold et al. ............................... 141/51 |
| 5,269,352 | 12/1993 | Gold ........................................ 141/51 |

OTHER PUBLICATIONS

"No Known Treatment for Accident Victims," *Sunday Times*, Trenton, New Jersey, Feb. 28, 1982, p. 87.

"This Stuff Is Getting To All Of Us!," *Fire Engineering*, Apr. 1983, pp. 21, 25–28.

"Poison Spills Impact Remains," *Richmond Times–Dispatch*, Mar. 16, 1983, pp. A1–A2.

"Something Out Of A Space Movie," *Richmond Times–Dispatch*, Feb. 1982, pp. A1–A2.

"Pentaborane Release, Environmental Laboratories, Hanover County, VA," National Response Team Briefing, Mar. 1982, pp. 1–2.

Memo, CECOS International, Inc. To Environmental Emergency Branch, Mar. 17, 1982, pp. 1–5.

Department of the Army, Office of the AMC Program Manager for Demilitarization of Chemical Material, "Supplement C to Project Eagle—Phase II Demilitarization and Disposal of the M34 Cluster at Rocky Mountain Arsenal Final Plan" (Feb. 1973), pp. viii–ix, 15–21, 1C–1 and 2C–15.

Solkatronic Chemicals, Inc., *Instruction Manual for Model 5502 Emergency Response Containment Vessel*, Oct., 1990.

American Petroleum Institute, "Procedures for Welding or Hot Tapping on Equipment Containing Flammables,"API Publication 2201, Third Edition, Oct., 1985.

U.S. Army Chemical Material Destruction Agency, *Generic Site Scoping Study*, Dec. 3, 1993, pp. 7–15—7–18.

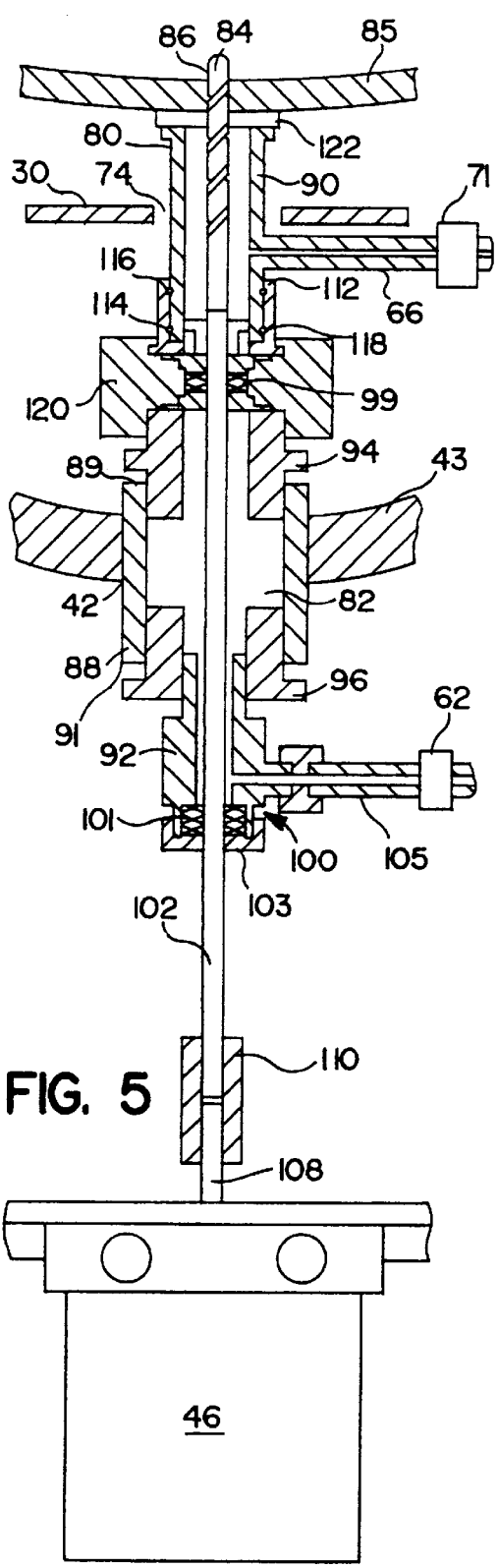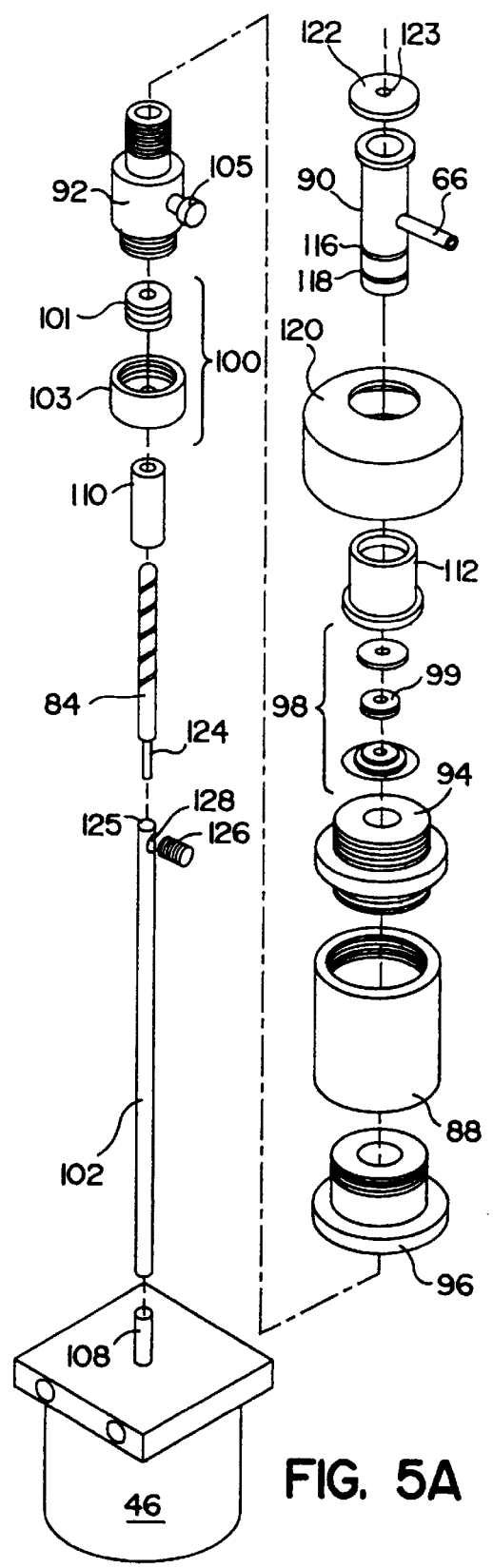

APPARATUS AND METHOD FOR CONTROLLED PENETRATION OF COMPRESSED FLUID CYLINDERS

CROSS REFERENCE TO RELATED APPLICATIONS

This application is a divisional application of U.S. application Ser. No. 08/570,478, filed Dec. 11, 1995 and entitled "Apparatus and Method for Controlled Penetration of Compressed Fluid Cylinders", now U.S. Pat. No. 5,613,534 which is a divisional of U.S. application Ser. No. 08/245,912 filed May 24, 1994, now U.S. Pat. No. 5,474,114 issued on Dec. 12, 1995, which is a continuation-in-part of U.S. application Ser. No. 08/070,709 filed May 28, 1993, now U.S. Pat. No. 5,427,157 issued on Jun. 27, 1995.

TECHNICAL FIELD OF THE INVENTION

This invention relates to the field of managing compressed fluid cylinders and particularly compressed fluid cylinders in a deteriorated condition.

BACKGROUND OF THE INVENTION

Compressed fluid cylinders may become unserviceable for several reasons such as valve assembly failure, damage or deterioration to the cylinder body, and/or damage or deterioration of pipe/hose connections associated with the valve assembly. The hazardous nature of compressed gas cylinders and other fluid containers in a deteriorated condition has become the focus of increasing attention. The result has been strict government regulations which limit the uncontrolled discharge of such container contents to the environment.

Examples of cylinder rupture vessels or containment vessels used for safely removing hazardous contents from deteriorated compressed fluid cylinders are shown in U.S. Pat. No. 4,690,180 titled "Cylinder Rupture Vessel"; U.S. Pat. No. 4,944,333 titled "Cylinder Rupture Vessel with Clamps for Immobilizing Container Within the Vessel", and U.S. Pat. No. 5,186,219 titled "Cylinder Rupture Vessel". These patents disclose containment vessels and their associated systems to secure a fluid cylinder or similar container within the containment vessel and to puncture or pierce the cylinder in a safe, controlled manner. The cylinder rupture vessels and their associated systems allow for environmentally acceptable removal of the contents from the cylinder and further processing of the contents as desired. The above-listed patents are incorporated by reference for all purposes within this application.

Deteriorated fluid cylinders may be ruptured in a safe, controlled manner by using a puncture spike or punch as shown in U.S. Pat. No. 4,690,180. Hydraulic puncture assemblies, as shown in U.S. Pat. No. 4,944,333, have also been used to penetrate fluid cylinders to allow the controlled release of the contents of the cylinders within a containment vessel. In addition, various types of projectiles have previously been fired at fluid cylinders positioned within a containment vessel to rupture the walls of the fluid cylinder to release the contents from the fluid cylinder into the interior of the containment vessel.

SUMMARY OF THE INVENTION

In accordance with the present invention, a drill assembly is provided for penetrating a wall of a container. The container is supported by a platform within a recovery vessel. The drill assembly allows removal of a fluid from the container. The drill assembly has a housing having an interior. A portion of the drill assembly defines a longitudinal bore. A shaft is rotatably disposed within the longitudinal bore. The shaft has one end engaged to a drill bit for penetrating the wall of the container. The other end of the shaft is engaged to a rotor for rotating the shaft. A seal assembly forms a fluid barrier between the longitudinal bore and the interior of the housing.

The drill assembly may be partly or completely enclosed within the recovery vessel. If only partly enclosed, the drill assembly may also have a tube for lining an opening into the recovery vessel. This tube will preferably define a portion of the longitudinal bore.

In one embodiment, the drill assembly also has a coupling assembly for coupling the housing to the tube which lines the opening into the recovery vessel. According to a feature of this embodiment, the interior of the housing may be sealed from its exterior. This may be accomplished by integrally connecting the housing and the coupling assembly, for example by welding, to seal the interior of the housing from its exterior. Alternatively, a plurality of O-rings may be disposed between the housing and the coupling assembly.

According to a feature of the present invention, the housing may have an end portion which abuts the wall of the container to form a fluid seal therewith. Also, more than one fluid seals may be formed at the end portion of the housing. In one embodiment, one fluid seal is formed by disposing a washer between the housing and the wall of the container. A second fluid seal is formed by disposing at least one O-ring between the housing and the wall of the container. In another embodiment, a plurality of raised annular surfaces may be provided on the end portion of the housing which engage the washer to form the second fluid seal.

In yet another embodiment, more than one drill assembly is employed. One or both of the drill assemblies may be as described above. If more than one drill assembly is used in the present invention, the drill assemblies may positioned in any number of configurations. According to one possible configuration, one drill assembly would be positioned above the container and one drill assembly would be positioned below the container.

According to a feature of an embodiment having multiple drill assemblies, at least one of the drill assemblies could be used as a conduit for introducing a flushing fluid into the container. This drill assembly may be positioned above the container. Another drill assembly could be used for removing the fluid from the container. This drill assembly may be positioned below the container.

A hold-down assembly may be provided within the recovery vessel for urging the container and the platform assembly toward a drill assembly. According to an embodiment of the present invention, at least one drill assembly may be coupled to the hold-down assembly.

A first technical advantage of the present invention is that it provides three levels of containment for protecting the environment from exposure to a fluid removed from a container.

A second technical advantage of the present invention is that it increases the efficiency of the process by which a hazardous fluid is removed from a container.

A third technical advantage of the present invention is that it reduces the risk of ignition of a fluid or a container containing the fluid during removal of the fluid from the container.

A fourth technical advantage of the present invention is that it reduces the risk of a fluid reacting violently with surfaces exposed to the fluid during its removal from a container.

BRIEF DESCRIPTION OF THE DRAWINGS

For a more complete understanding of the present invention, and the advantages thereof, reference is now made to the following descriptions taken in conjunction accompanying drawings, in which:

FIG. 3A is an exploded isometric view of the drill assembly of FIG. 3;

FIG. 5 is an exploded view of a drill assembly for penetrating the container of FIGS. 1 and 2, according to still another embodiment of the present invention;

FIG. 5A is an exploded isometric view of the drill assembly of FIG. 5;

DETAILED DESCRIPTION OF THE INVENTION

The preferred embodiment of the present invention and its advantages are best understood by referring to FIGS. 1–10 of the drawings, like numerals being used for like and corresponding parts of the various drawings.

As an overview of the present invention, a fluid recovery system 10 provides a sealed recovery vessel 12 for receiving container 14. The contents of container 14, typically hazardous waste fluids, can then be removed without polluting the environment by using recovery system 10. The pressures under which the fluid contents may be stored in container 14 can range up to approximately 6000 psi. Additionally, the fluid within container 14 may be in a gas phase, a liquid phase or a combination of both a gas and liquid phase. Typically, container 14 has been sealed shut either purposely or inadvertently, and cannot be emptied by normal procedures. After the fluid is removed from container 14, the fluid and container can be disposed of safely. Recovery system 10 allows for removal of any hazardous fluids within container 14 from a remote location to ensure the safety of personnel controlling the fluid recovery process.

Figure 1:
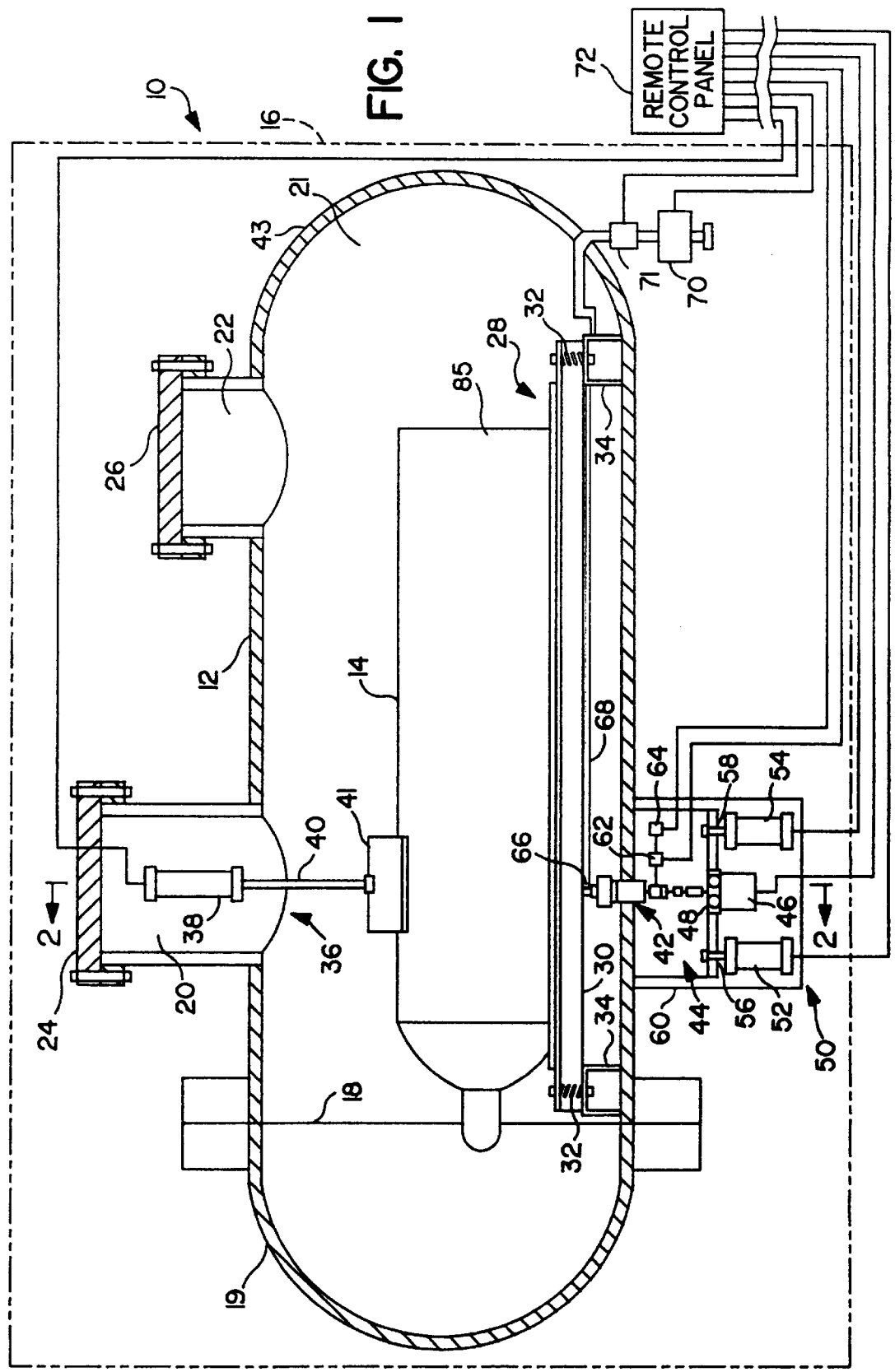
FIG. 1 is a fluid recovery system for recovering fluid from a sealed container.

More specifically, FIG. 1 is a side view of fluid recovery system 10. Fluid recovery system 10 is typically housed in a sealed trailer 16 to allow movement of fluid recovery system 10 to the location of any deteriorated containers. Thus, safety is increased by avoiding transportation of the deteriorated containers, as well as by providing a third level containment. (The trailer being the third level, with recovery vessel 12 being the second level, and drill assembly 44 being the first level as is discussed below.)

Fluid recovery system 10 includes a recovery vessel 12 which has a sealable end opening 18 through which container 14 may be inserted. End closure 19 is then secured to end opening 18 to seal the interior 21 of recovery vessel 12 from the environment. A fluid tight barrier is preferably maintained between the interior 21 and the exterior of recovery vessel 12.

Recovery vessel 12 also includes two access openings 20 and 22. Access openings 20 and 22 provide additional entries into interior 21 of recovery vessel 12. Closures 24 and 26 seal interior 21 from the environment when secured to access openings 20 and 22 respectively. Although recovery vessel 12 and container 14 are shown as cylinders, various sizes, shapes and configurations of recovery vessels and containers may be satisfactorily used with the present invention.

Container 14 is placed on platform assembly 28 disposed within recovery vessel 12. Platform assembly 28 includes a platform 30 which is supported by four springs 32. Springs 32 are respectively attached to the interior of recovery vessel 12 by four support members 34. Springs 32 of platform assembly 28 allow platform 30 to move in a plane perpendicular to that of platform 30.

Fluid recovery system 10 also includes a hold-down assembly 36 having a hydraulic cylinder 38, hydraulic piston rod 40, hold-down clamp 41 and a support member (not shown) for securing hydraulic cylinder 38 to the interior portion of wall 43 of recovery vessel 12.

An opening 42 extends through wall 43 of recovery vessel 12 and provides drill assembly 44 with access to container 14. Drill assembly 44 is discussed in greater detail below in conjunction with FIGS. 3–10. Drill assembly 44 is driven by a drill motor 46 which is secured to motor support 48.

Drill assembly 44 and drill motor 46 are positioned relative to container 14 by drill positioning assembly 50. Drill positioning assembly 50 includes two hydraulic cylinders 52 and 54. Piston rods 56 and 58, which are positioned by cylinders 52 and 54 respectively, are coupled to motor support 48. Frame 60 secures cylinders 52 and 54 to the exterior of wall 43 of recovery vessel 12. Drill assembly 44, motor 46, motor support 48 and drill positioning assembly 50 are preferably located on the exterior of wall 43 of recovery vessel 12 opposite from container 14 and platform 30. However, these components may be located within recovery vessel 12.

The specific location of opening 42 may be selected along with the location of platform assembly 28 and hold-down assembly 36 to optimize the performance of drill assembly 44 to penetrate container 44. The optimum location may vary depending upon the fluids which will be released and the type of container containing the fluids.

Hold-down assembly 36, drill positioning assembly 50, drill motor 46, valve 54 and valve 60 are all capable of being controlled remotely from remote control panel 72. Remote control panel 72 is typically located outside of trailer 16 at a distance sufficient to provide for safe operation.

Figure 2:
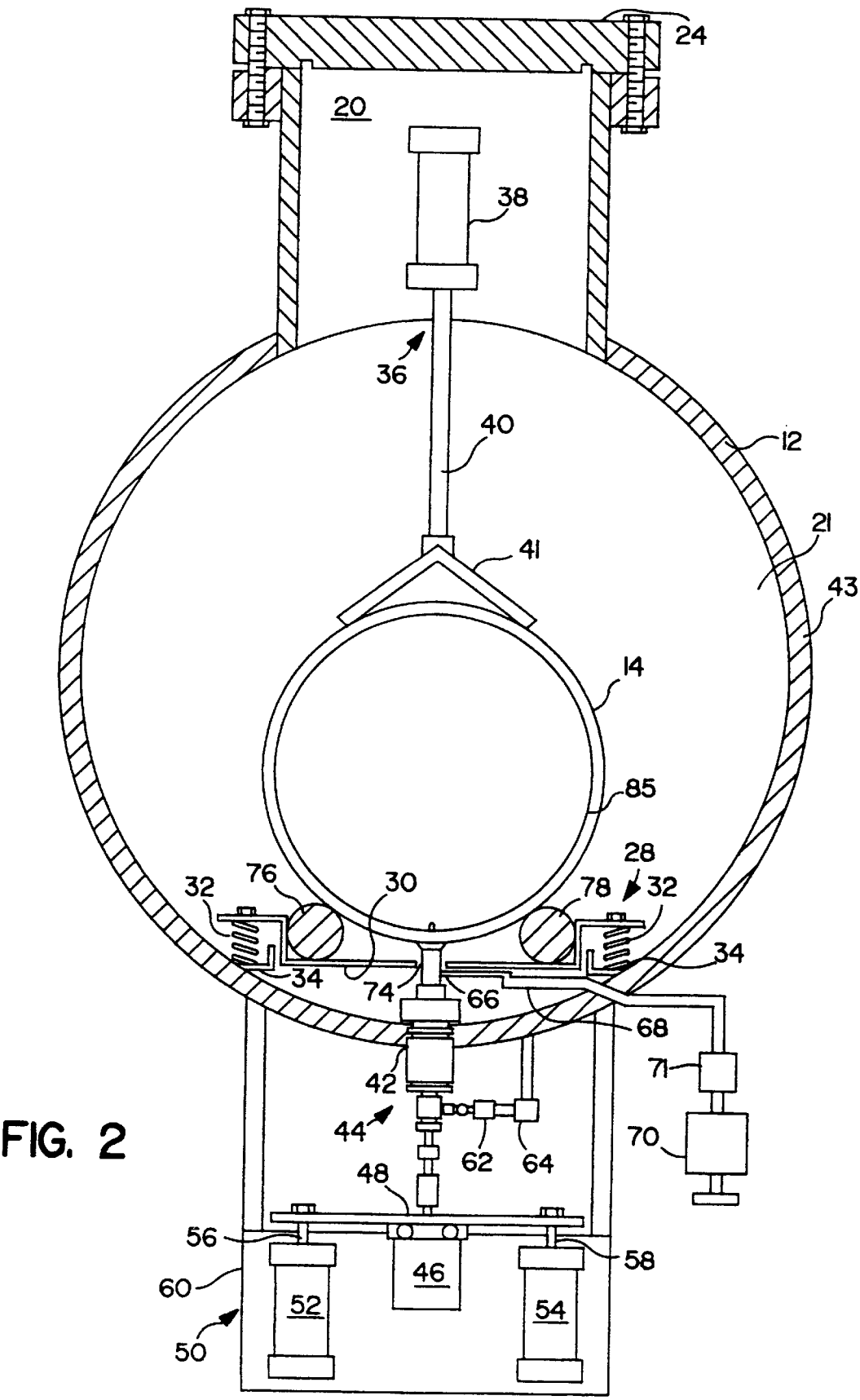
FIG. 2 is a view of the fluid recovery system of FIG. 1 along lines 2—2 of FIG. 1.

FIG. 2 shows an end view of the fluid recovery system 10 of FIG. 1 along lines 2—2. In FIG. 2 an opening 74 is shown in platform 30 to accommodate drill assembly 44. Two rails 76 and 78, which are part of platform assembly 28, are disposed along the outer edges of platform 30. Rails 76 and 78 cooperate with hold-down assembly 36 to prevent container 14 from rolling on platform 30. Drill assembly 44, motor 46, support 48 and drill positioning assembly 50 are shown disposed in another possible orientation with respect to recovery vessel 12. Such orientation does not affect the operation of fluid recovery system 10.

Referring again to FIG. 1, a first pressure transducer 62 is coupled to a port 105 of drill assembly 44. A valve 64 is coupled between first transducer 62 and interior 21 of recovery vessel 12. Inside recovery vessel 12, drill assembly 44 includes a cylindrical evacuation port 66 which is coupled to a pipe 68. Pipe 68 is coupled through wall 43 of recovery vessel 12 to a valve 70. A second pressure transducer 71 is also coupled to pipe 68. Pressure transducers 62 and 71 may be monitored from control panel 72. Valves 64 and 70 may be operated from control panel 72. FIG. 2 shows transducers 62 and 71, valves 64 and 70, evacuation port 66 and pipe 68 disposed in another possible orientation with respect to recovery vessel 12. Again, such orientation does not affect the operation of fluid recovery system 10.

In operation container 14 is carefully placed upon platform assembly 28 through end opening 18. End closure 19 is then closed to seal container 14 inside recovery vessel 12. Trailer 16 is sealed as well. Hydraulic cylinder 38 is activated to urge, via hydraulic piston rod 40 and hold-down clamp 41, container 14 toward platform assembly 28. Support springs 32 are compressed, allowing platform 30 to be moved toward opening 42 and drill assembly 44. Container 14 is continually urged downward until drill assembly 44 makes sealable contact with the exterior of container 14, as shown in FIG. 2. Hold-down assembly 36 then maintains container 14 in this position.

Figure 3:
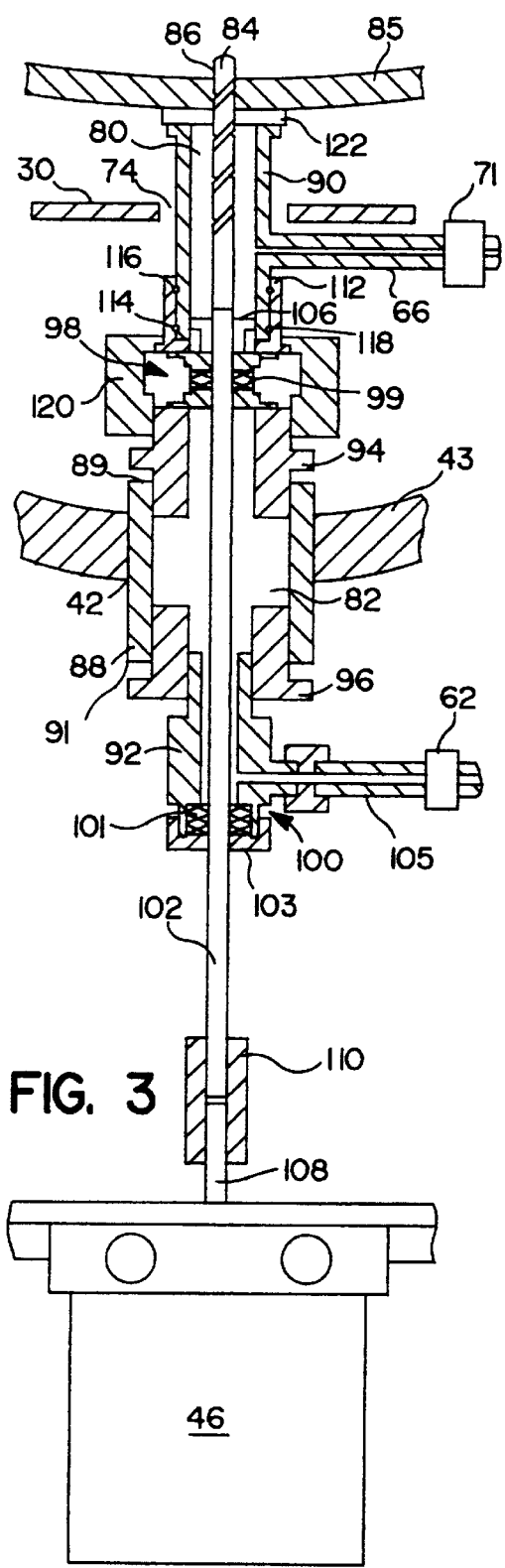
FIG. 3 is an exploded view of a drill assembly for penetrating the container of FIGS. 1 and 2, according to an embodiment of the present invention.

FIG. 3 is an exploded view of drill assembly 44 as installed in FIGS. 1 and 2. Referring to FIG. 3, opening 42 in wall 43 of recovery vessel 12 is provided for installation and support of drill assembly 44. Cylindrical tubing 88 lines the inside diameter of opening 42. For this embodiment, cylindrical tubing 88 is welded within opening 42, although any other form of attachment may be used, such as threading both the outer surface of cylindrical tubing 88 and the inside diameter of opening 42.

Drill assembly 44 includes a first housing section 90 and a second housing section 92. First adapter 94 is provided to secure first housing section 90 to end 89 of tubing 88 within recovery vessel 12. Second adapter 96 is provided to secure second housing section 92 to end 91 of tubing 88 on the exterior of recovery vessel 12. A plurality of matching threads are used to attach first and second adapters 94 and 96 with their respective first housing section 90 and second housing section 92 to ends 89 and 91 of tubing 88. Housing sections 90 and 92, adapters 94 and 96 and tubing 88 cooperate with each other to define longitudinal bore 82 extending therethrough.

A first seal assembly 98, having a first packing 99, is placed on the end of first adaptor 94 opposing the end threaded into tubing 88. A second seal assembly 100, having a second packing 101, is retained within second housing section 92 by packing nut 103. First and second seal assemblies 98, 100 may be any suitable assemblies including commercially available assemblies. While the type of packing assembly is not critical the type selected may affect the performance and reliability of the seal. Second housing section 92 is threaded into the inside surface of second adaptor 96. Thus, longitudinal bore 82 is formed from the interior of adapter 94, through tube 88, to the interior of adapter 96. Evacuation port 66 allows access to interior 80 of housing section 90, while port 105 allows access to longitudinal bore 82. First and second packing 99, 101 are preferably of Teflon™ construction, but any suitable packing material may be used.

A shaft 102 extends from the interior of first housing section 90, through bearing assembly 106, first seal assembly 98, longitudinal bore 82, and second seal assembly 100. Drill bit 84 is coupled to a drill end of shaft 102, while a drive end is coupled to motor shaft 108 by coupler 110.

Figure 4:
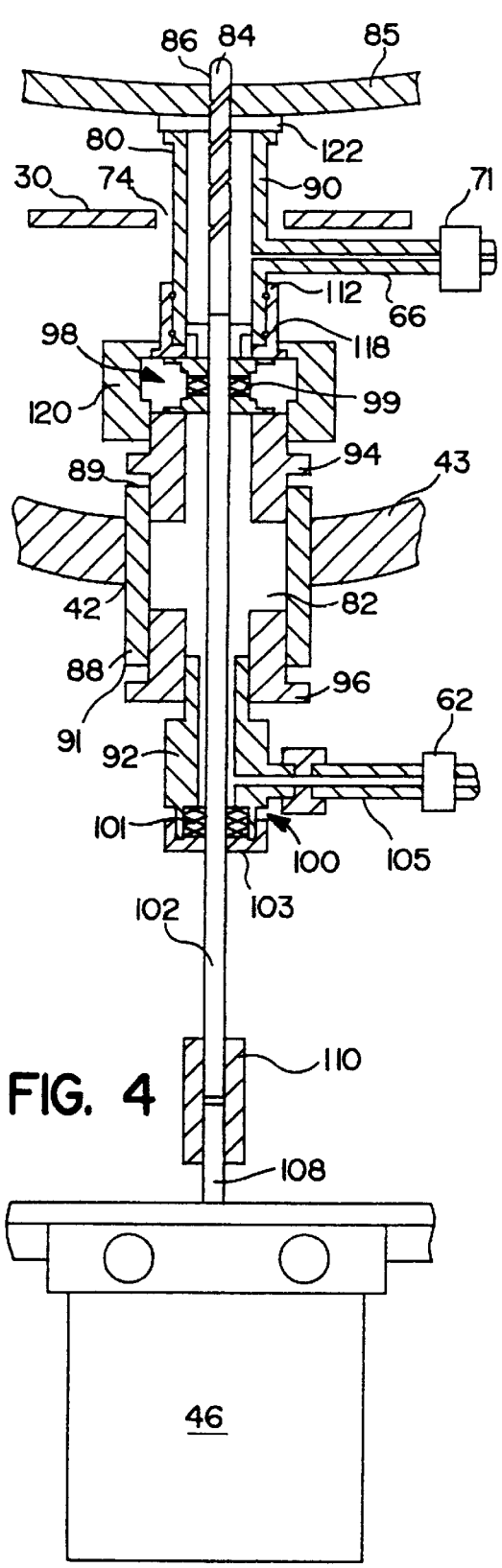
FIG. 4 is an exploded view of a drill assembly for penetrating the container of FIGS. 1 and 2, according to another embodiment of the present invention.
Figure 4A:
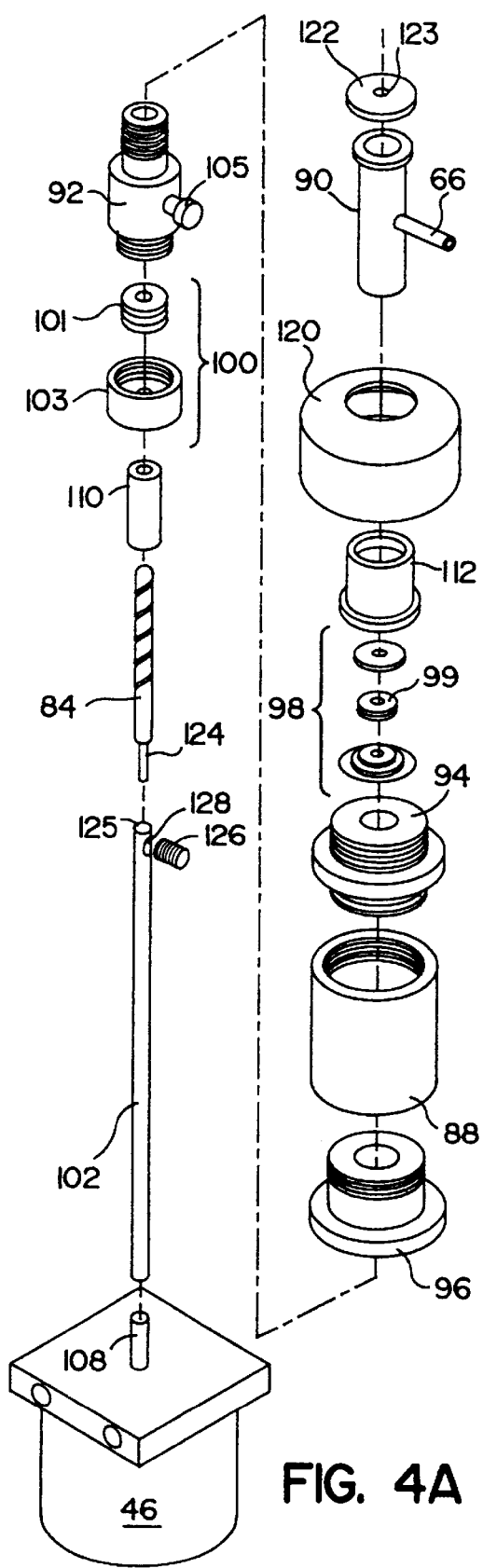
FIG. 4A is an exploded isometric view of the drill assembly of FIG. 4.

A coupling sleeve 112 having a lip 114 surrounds a lower portion of first housing section 90. A seal is formed between first housing section 90 and coupling sleeve 112 by two O-rings 116 and 118. Alternatively, the seal can be achieved by integrally connecting, for example by welding, first housing section 90 to an end portion of coupling sleeve 112 as shown in FIGS. 4 and 4A.

The inner portion of lip 114 is disposed between one end of first housing section 90 and first seal assembly 98. Coupling member 120 engages the outer portion of lip 114 to secure sleeve 112 to first adapter 94. When coupling member 120 is tightened, the inner portion of lip 114 is forced against first seal assembly 98 to form a seal as described below.

In an alternative configuration shown in FIGS. 5 and 5A, lip 114 has no inner portion disposed between the one end of first housing section 90 and the first seal assembly 98. Instead, the one end of first housing section 90 directly engages first seal assembly 98. In this configuration, as container 14 is urged toward drill assembly 44, first housing section 90 is forced against first seal assembly 98 to form a seal. This arrangement requires that first housing section 90 be movable relative to coupling sleeve 112.

Referring again to FIG. 3, a portion of the interior surface of coupling member 120 has threads which engage threads on the outer surface of adapter 94. A washer 122, having a center hole 123 (FIG. 3A) sized to receive drill bit 84, is inserted between first housing section 90 and the exterior of wall 85 of container 14.

As shown in FIG. 3A, drill bit 84 has a shank 124 for insertion into a receiving cavity 125 within the drill end of shaft 102. Shank 124 is secured within cavity 125 by set screw 126. Set screw 126 is threaded into set screw receiving hole 128. Set screw receiving hole 128 extends from the cavity to the exterior of shaft 102. These features are also shown in other figures, for example FIGS. 4A and 5A, which depict other features and embodiments of the present invention.

Figure 12:
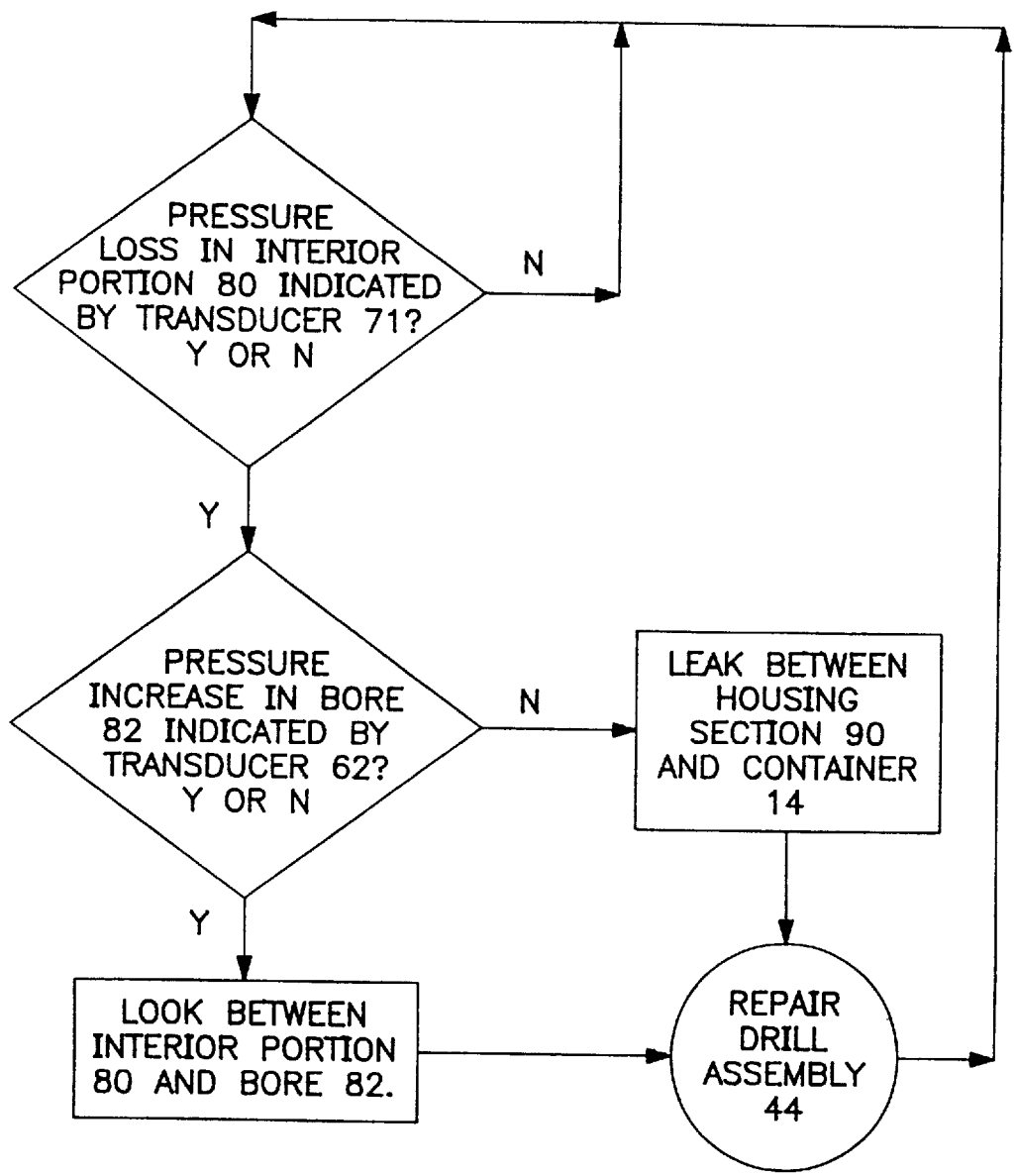
FIG. 12 is a flow chart.

The structure of drill assembly 44 provides a leak detection feature. The logic of this feature is shown in the flow chart of FIG. 12. Referring also to FIGS. 3–5A, after a fluid seal is established between drill assembly 44 and the exterior of container 14, an interior portion 80 of drill assembly 44 is filled with an inert gas. Transducer 71 monitiors the pressure within interior portion 80. If the pressure detected by transducer 71 decreases, a leak is indicated. This leak could occur, for example, at the fluid seal formed between first housing section 90 and wall 85 of container 14 or at first seal assembly 98, between interior portion 80 and a longitudinal bore 82 of drill assembly 44. To determine where the leak is, transducer 62 monitors the pressure in a longitudinal bore 82 of drill assembly 44. As shown in FIG. 12, when the pressure detected by transducer 71 decreases and the pressure detected by transducer 62 increases, a leak between interior portion 80 and longitudinal bore 82 is indicated.

When the pressure detected by transducer 71 decreases, but the pressure detected by transducer 62 does not increase, a leak between housing section 90 and wall 85 of container 14 is indicated.

When such leaks occurs, drill assembly 44 must be disassembled and repaired. If no leak is detected, motor 46 is activated and rotates a drill bit 84. Drill positioning assembly 50 urges drill bit 84 forward until it makes contact with and penetrates wall 85 of container 14. Any fluid waste within container 14 may then be withdrawn through the penetration 86 via interior portion 80, evacuation port 66, pipe 68 and valve 70. Transducers 62 and 71 may be substituted with other suitable pressure detectors.

By confining the fluid to the relatively small volume of interior 80, rather than the much larger volume of recovery vessel 12, the fluid removal efficiency is increased. That is, by minimizing the number of surfaces to which the fluid is exposed (the inside wall of interior 80 versus the interior side of wall 23 and the outside of wall 85), the decontamination of these surfaces is minimized.

Figure 9:
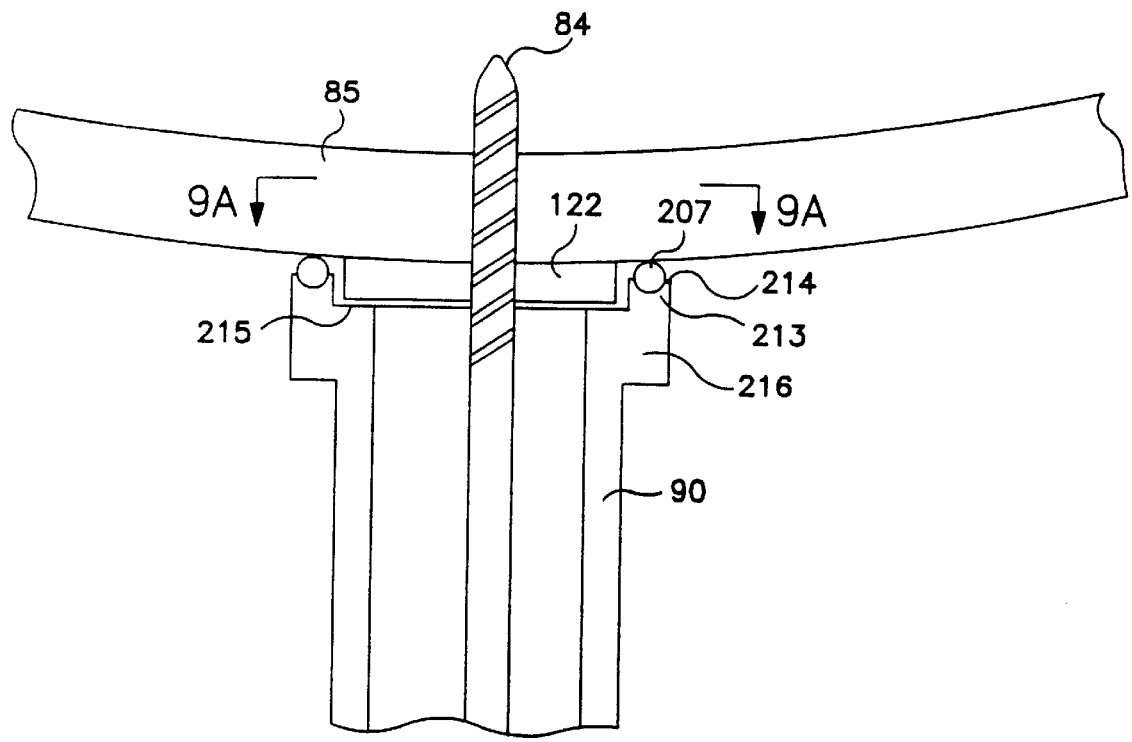
FIG. 9 is a detailed view of a portion of a drill assembly.
Figure 9A:
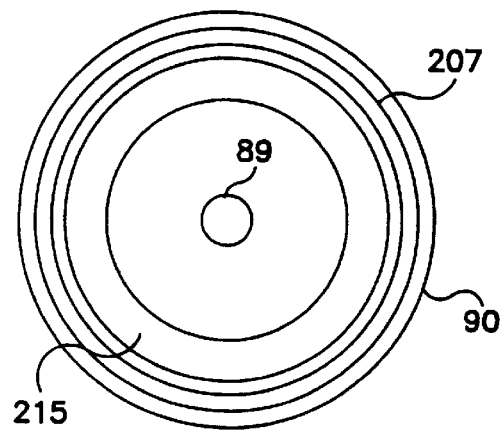
FIG. 9A is a view of the drill assembly of FIG. 9 along lines 2—2 of FIG. 8.

Another embodiment is depicted in FIGS. 9 and 9A, in which the one end of first housing section 90 is shown cooperating with washer 122 to form one or more fluid seal with wall 85 of container 14. In this embodiment, the one end of first housing section 90 is formed to have annular projection 216.

According to one aspect of this embodiment, an annular extension 213 extends longitudinally from annular projection 216. The formation of projection 216 and extension 213 results in bearing surface 215 and end surface 214. Two fluid seals are created between first housing section 90 and container 14. A first fluid seal is formed by disposing washer 122 between bearing surface 215 of first housing section 90 and wall 85 of container 14. A second fluid seal is formed by disposing an O-ring 207 between end surface 214 of extension 213 and wall 85 of container 14. Preferably, the structure of the one end of first housing section 90 is such that O-ring 207 is positioned radially outward from washer 122 as shown in FIGS. 9 and 9A In this arrangement, the fluid seal formed by washer 122 functions as a primary fluid seal and the fluid seal formed by O-ring 207 functions as a secondary, or backup, fluid seal. It will be appreciated however, that the one end of first housing section 90 may be formed differently such that the seal incorporating O-ring 207 is positioned radially inward from the seal incorporating washer 122. Further, although only one O-ring and one washer are shown in FIGS. 9 and 9A, multiple O-rings and/or washers may be used to add further fluid seals or to otherwise improve the existing fluid seals.

Figure 10:
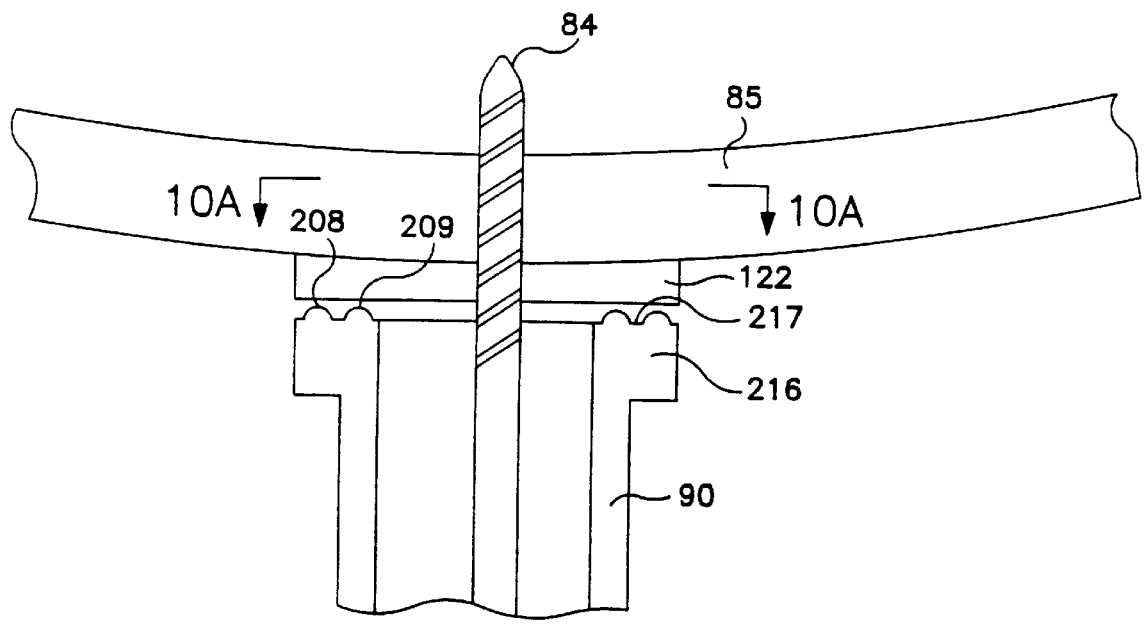
FIG. 10 is a detailed view of a portion of a drill assembly.
Figure 10A:
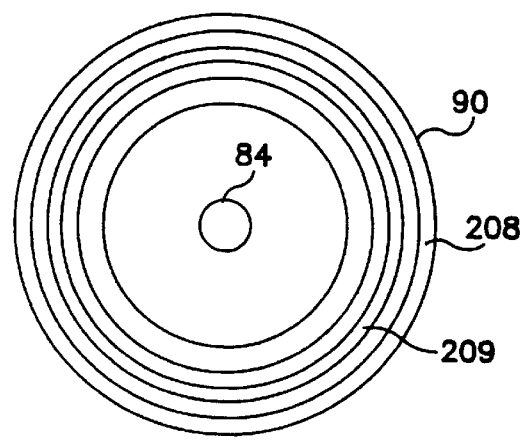
FIG. 10A is a view of the drill assembly of FIG. 10 along lines 2—2 of FIG. 10.

According to another aspect of this embodiment, as shown in FIGS. 10 and 10A, the one end of first housing section 90 is formed to have annular projection 216 as described above. One or more raised annular surfaces extend longitudinally from end surface 217 to engage washer 122. FIGS. 10 and 10A shown two raised annular surfaces 208, 209, but any number of such raised annular surfaces may be incorporated into this aspect of the invention. A fluid seal is formed between washer 122 and wall 85 of container 14. Additional fluid seals are formed at the respective points of contact between annular surfaces 208, 209 and washer 122.

In operation, coupling member 120 is tightened so that seal assembly 98 forms a first fluid barrier (by forcing packing 99 to form a seal around a first portion of shaft 102) between interior 80 of housing section 90 and longitudinal bore 82. Packing nut 103 is tightened so that seal assembly 100 forms a second fluid barrier (by forcing packing 101 to form a seal around a second portion of shaft 102) between longitudinal bore 82 and the outside environment. Hold-down assembly 36 is activated in response to a first signal from remote control panel 72. Container 14 is forced against washer 122 and/or O-ring 207 (FIGS. 9, 9A). Washer 122, in turn, is forced against first housing section 90 and/or bearing surface 215 (FIGS. 10, 10A) or raised annular surfaces 208, 209 (FIGS. 10, 10A) to form the fluid seal(s) between first housing section 90 and wall 85 of container 14.

In some embodiments, washer 122 is made of a material, such as lead, which allows washer 122 to conform to the contour of wall 85. In other embodiments, washer 122 is pre-formed to the contour of wall 85. The force exerted upon housing section 90 by container 14 aids in forming the first fluid barrier by further compressing packing 99.

Drill motor 46, in response to a second signal from panel 72, rotates shaft 102. Bearing assembly 106 stabilizes shaft 102 as it rotates. Although bearing assembly 106 is not depicted in certain figures, for example FIGS. 4–5A, bearing assembly 106 may be incorporated into the embodiments shown therein. Drill positioning assembly 50 is activated in response to a third signal from panel 72. Drill bit 84 is urged toward container 14, as described above in conjunction with FIGS. 1 and 2, by drill positioning assembly 50 until it comes in contact with wall 85. Drill bit 84 is then further urged toward container 14 until wall 85 is penetrated to form penetration 86. Typically, a change in pressure within pipe 68 indicates the formation of penetration 86. An indication of the pressure within pipe 68 may be obtained by remotely monitoring second transducer 71 with control panel 72. Drill positioning assembly 50, in response to a fourth signal from panel 72, retracts drill bit 84 from container 14. The fluid within container 14 can be drained or pumped out of container 14 via penetration 86, evacuation port 66, pipe 68 and valve 70.

The relatively small volume of interior 80 aids in preventing ignition of wall 85 of container 14 by minimizing the time during which the fluid escapes through penetration 86. As the fluid escapes, the friction between the fluid and the portion of wall 85 near penetration 86 generates heat. The longer the escape time, the higher the temperature of the portion of wall 85 surrounding penetration 86 becomes. The temperature may become high enough to ignite wall 85. The escape time is proportional to the volume into which the fluid escapes. That is, fluid, especially in a gas phase, will escape until the pressure within the escape volume reaches equilibrium with the pressure inside container 14. The smaller the volume, the more quickly such equilibrium is reached, and the lower the amount of heating which occurs. The lower the amount of heating, the less of a chance of ignition.

A further measure which can be taken to prevent fluid ignition is to evacuate interior 80 of air via port 66 before penetration. Additionally, after evacuation is performed, interior 80 may be pressurized with an inert gas via port 66. The pressure within interior 80 is typically raised to a point above the anticipated pressure of the contents of container 14. When penetration occurs, the more highly pressurized inert gas flows through penetration 86 into container 14. Thus, if any heating occurs, it will be to the inert gas which will not ignite. If the pressure within interior 80 is less than that of the fluid inside container 14, the inert gas dilutes the escaping fluid, thus reducing the probability of ignition.

Interior 80 may be pressurized with a passivation gas when the fluid is a strong oxidizer, such as certain fluorinated compounds. Typically, the passivation gas consists of approximately 20% fluorine and 80% nitrogen. The passivation gas causes a thin oxidation layer to be formed on the surfaces which are exposed to the fluid once penetration of wall 85 occurs. Such surfaces include the inner surfaces of first housing section 90, port 66 and pipe 68, as well as the outer surface of drill bit 84. The thin oxidation layer prevents the strong oxidizer within container 14 from reacting with the above mentioned surfaces.

Decontamination of a fluid, such as a poison, may sometimes be necessary. Such decontamination is accomplished by injecting a decontaminate into container 14 via pipe 68, port 66, interior 80 and penetration 86.

Eradication of living organisms within the fluid may be necessary. Such eradication is accomplished by injecting a killing agent into container 14 via pipe 68, port 66, interior 80 and penetration 86.

The pressure within longitudinal bore 82 may be monitored by first pressure transducer 62. If the pressure within longitudinal bore 82 increases when interior 80 is filled with an inert gas or when penetration into container 14 occurs, a leak from interior 80 into bore 82, i.e., a failure of the first fluid barrier, is indicated. In the event such a leak occurs, second seal assembly 100 prevents any fluid from leaking into the environment to reestablish the first fluid barrier, first seal assembly 98 may be replaced. Alternatively, coupling member 120 may be tightened to further compress packing 101 and reestablish the first fluid barrier. Fluid which does leak into longitudinal bore 82 is contained by second seal assembly 100 and may be redirected to interior 21 of recovery vessel 12 by opening valve 64. The leaking fluid is thereby isolated from the external environment.

In another embodiment of the drill assembly of the present invention, second housing section 92, second seal assembly 100, first transducer 62 and valve 64 are not installed. The operation of drill assembly 44 remains the same as outlined above. However, if first seal assembly 98 fails to maintain the first fluid barrier, the fluid from container 14 may leak directly into the interior of trailer 16, as opposed to being contained by second seal assembly 100. Sealed trailer 16, however, isolates the leaking fluid from the external environment.

Figure 6:
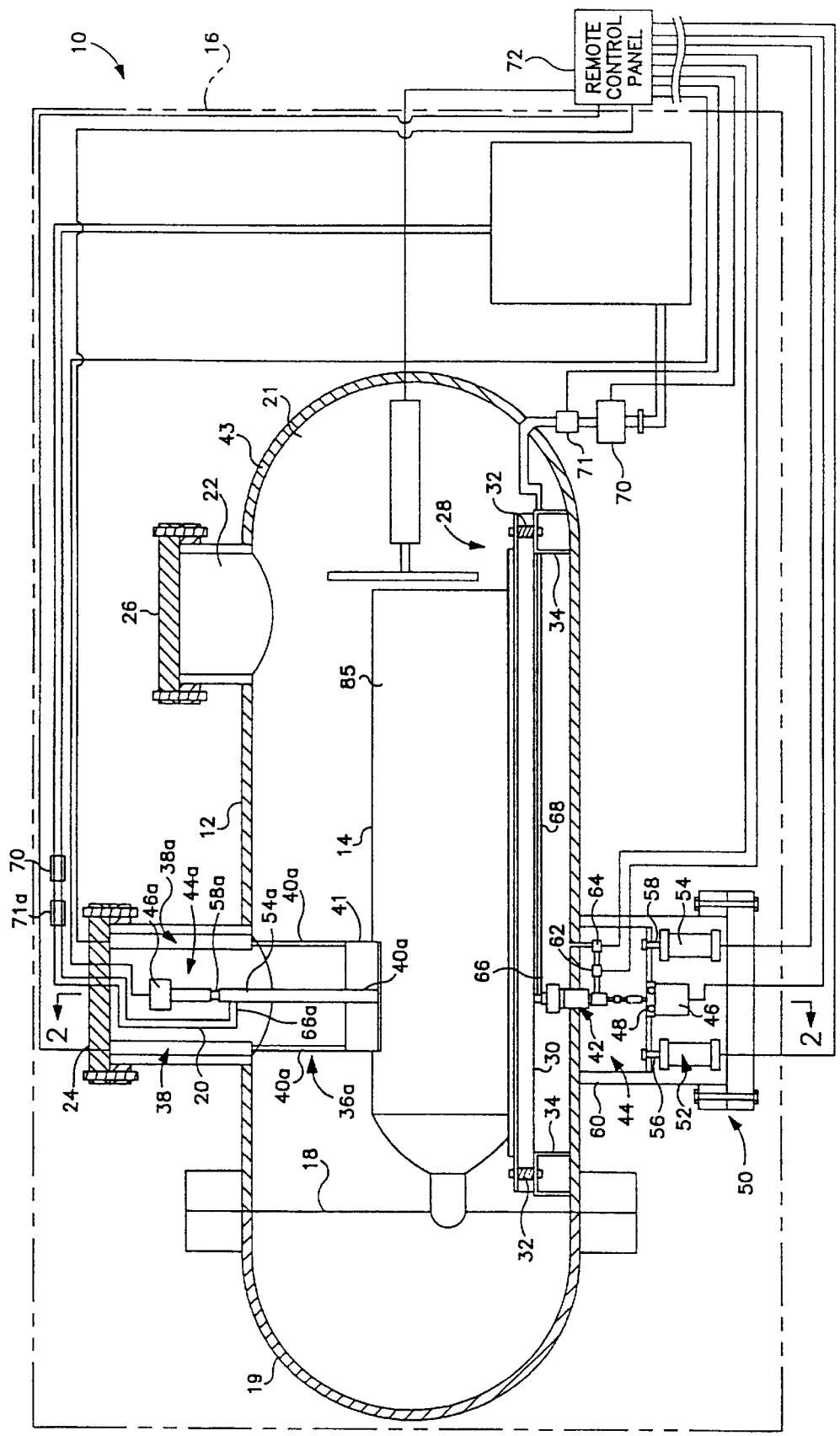
FIG. 6 is a fluid recovery system for recovering fluid from a sealed container.
Figure 7:
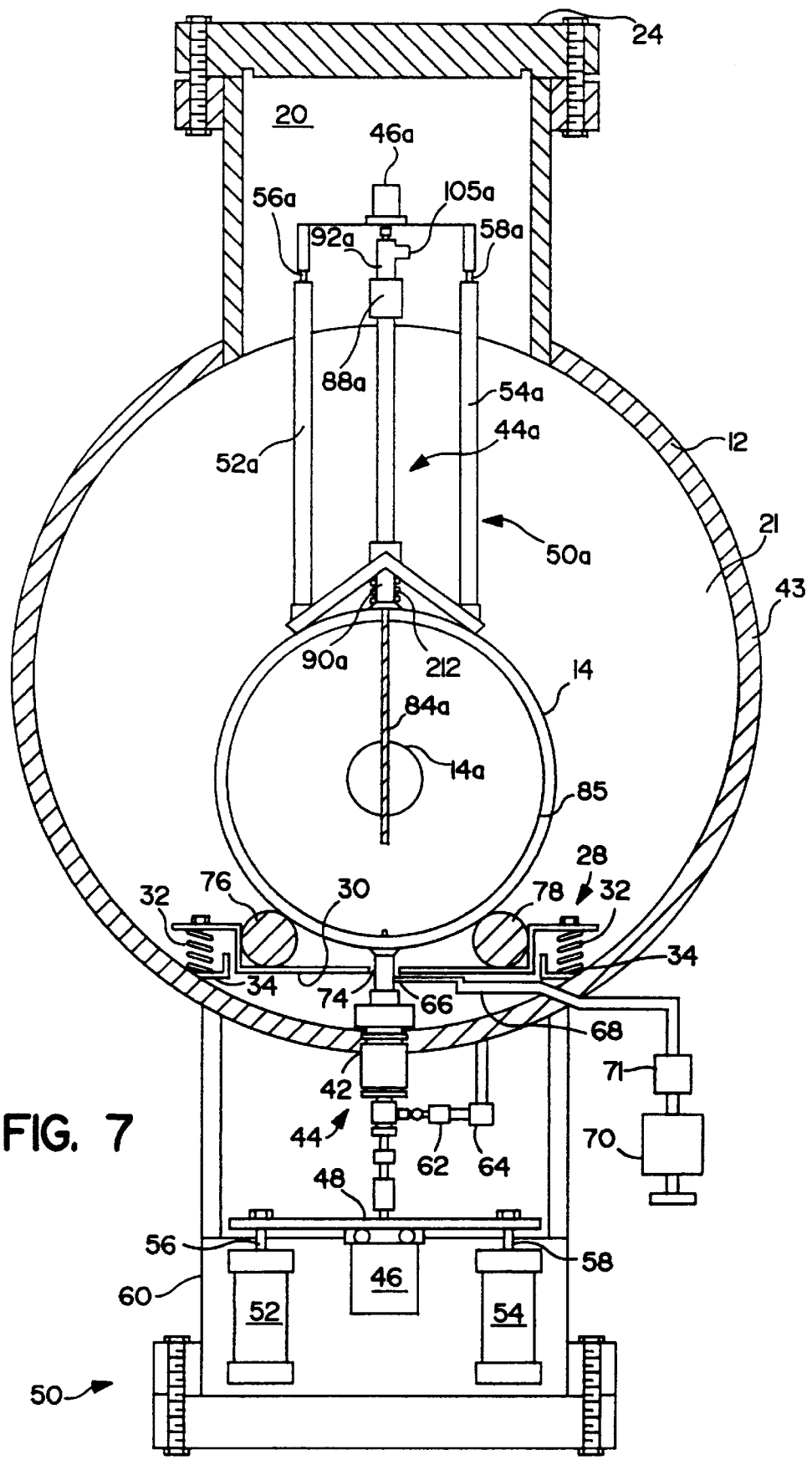
FIG. 7 is a view of the fluid recovery system of FIG. 6 along lines 2—2 of FIG. 6.

In another embodiment of the present invention, as shown in FIGS. 6 and 7, a plurality of drill assemblies may be incorporated to penetrate wall 85 and remove the fluid from container 14. Any number of drill assemblies may be used and their positioning relative to container 14 and recovery vessel 12 may be varied. FIG. 6 depicts a first drill assembly 44 positioned generally below container 14. A second drill assembly 44a is positioned above container 14 within access opening 20. Second drill assembly 44a is similar to first drill assembly 44 and has many of the same components including first and second housing sections 90a and 92a, a coupling assembly 88a, which joins first and second housing sections 90a and 92a and partially defines a longitudinal bore, and first and second seal assemblies. Drill bit 84a is disposed within the longitudinal bore of second drill assembly 44a. Drill bit 84a is preferably of sufficient length so that in operation it may extend at least to a longitudinal centerline of container 14. In this respect, drill bit 84a would be able to penetrate not only container 14, but also any container possibly located within container 14. Drill bit 84a may be of sufficient length to penetrate through opposite sides of wall 85 of container 14. Although second drill assembly 44a is shown with first and second housing sections, it may be desirable, as described above to limit second drill assembly 44a to only one housing section.

A hold-down assembly 36a, similar to the hold-down assembly described above, has a pair of hydraulic cylinders 38a, a pair of hydraulic piston rods 40a, a hold-down clamp 41a, and a support member (not shown) for securing hydraulic cylinders 38a to the interior surface of wall 43 of recovery vessel 12. The operation of hold-down assembly 36a is essentially as described above for hold-down assembly 36 depicted in FIGS. 1 and 2. Second drill assembly 44a is driven by a drill motor 46a which is secured to motor support 48a.

Second drill assembly 44a and drill motor 46a are positioned relative to container 14 by drill positioning assembly 50a. Drill positioning assembly 50a includes two hydraulic cylinders 52a and 54a, which are respectively connected at one end thereof to hold-down clamp 41a. Piston rods 56a and 58a, which are positioned by cylinders 52a and 54a respectively, are coupled to motor support 48a.

First housing section 90a movably extends through hold-down clamp 41a to contact wall 85 of container 14. In operation, piston rods 40a are activated to urge hold-down clamp 41a toward container 14. As first housing section 90a makes contact with wall 85 of container 14, a spring 212, disposed about first housing section 90a engages a lower surface of hold-down clamp 41a and an end portion of first housing section 90a to bias first housing section 90a against wall 85 to create a fluid seal therebetween. The features described above relating to seals between housing section 90 and wall 85 may be employed in forming the fluid seal between housing section 90a and wall 85.

After sealable contact is made, hydraulic pistons 56a and 58a are activated to urge drill bit 84a toward container 14 to penetrate container 14. A first port 66a is provided on first housing section 90a to allow removal of the fluid from container 14. A first conduit 68a is attached to first port 66a to direct the fluid to the exterior of recovery vessel 12 and to collection vessel 210. The portion of first conduit 68a within interior 21 of recovery vessel 12 is preferably flexible, for example flexible hosing. A transducer 71a and a valve 70a are positioned along first conduit 68a. Transducer 71a and valve 70a operate similar to transducer 71 and valve 70 described above. A second port 105a extends from second housing section 92a to place the interior of second housing section 92a in fluid communication with interior 21 of recovery vessel 12. If a leak occurs in the first seal assembly, the fluid may then escape into interior 21 and not the outside environment.

Figure 8:
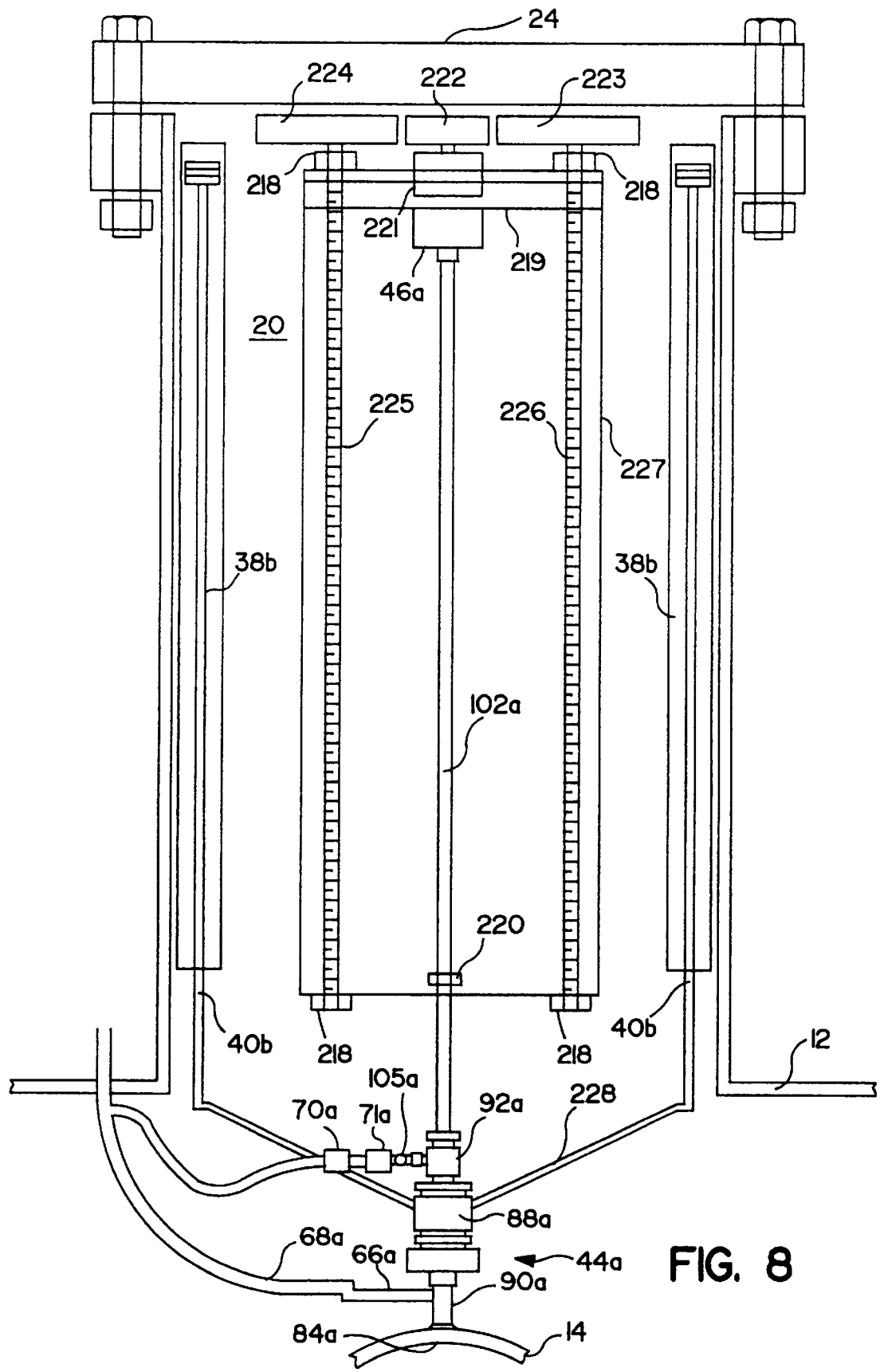
FIG. 8 is a partial view of a fluid recovery system for recovering fluid from a sealed container.

In an alternative arrangement, as shown in FIG. 8, a second conduit 68b may be attached to second port 105a. Second conduit 68b may also be connected to first conduit 68a to place the respective interiors of first and second conduits 68a and 68b in fluid communication. In this arrangement, transducer 71a and valve 70 are positioned along second conduit 68b between second housing section 92a and first conduit 68a. If a leak occurs in the first seal assembly, transducer 71a will detect the leak and fluid in the interior of second housing portion 92a can be directed through second port 105a, conduit 68b, valve 70a and conduit 68a.

In the embodiment depicted in FIG. 8, hydraulic cylinders 38b and hydraulic piston rods 40b are provided similar to hydraulic cylinders 38a and hydraulic piston rods 40a of FIGS. 6 and 7. In this embodiment, however, hold-down clamp 41a is not provided and rods 40b are coupled to second drill assembly 44a by braces 228.

A first motor 46a is mounted on drill motor support 219, which is movable relative to container 14. First motor 46a turns shaft 102a and drill bit 84a, which is coupled to shaft 102a. Shaft 102a is preferably supported by bearing 220. A second motor 221 is coupled to a plurality of gears 222, 223, and 224. Gears 223, 224 are coupled to first and second threaded rods 225 and 226, respectively. Motor 221 turns gear 222, which turns gears 223, 224. First and second threaded rods 225, 226 are mounted on frame 227 and are operatively coupled to support 219 such that when first and second threaded rods 225, 226 are turned, support 219 travels along rods 225, 226. Movement of support 219 is limited by pillow block bearings 218.

In operation, once sealable contact has been made between first housing section 90a and wall 85 of container 14, first motor 46a is activated to turn shaft 102a and drill bit 84a. Second motor 221 is also activated to turn gears 222, 223, and 224. The gears operate to turn threaded rods 225, 226, thereby moving support 219 shaft 102a and drill bit 84a toward container 14. Threaded rods 225, 226 may of course be turned the opposite direction to move support 219 away from container 14, thereby withdrawing drill bit 84a from container 14.

In this embodiment, it is preferable that the portions of first and second conduits 68a and 68b, which are located within interior 21 of recovery vessel 12, are flexible. This will allow movement of support 219 and drill assembly 44a without rupturing conduits 68a and 68b or causing these conduits to become damaged, tangled or otherwise inoperable.

Figure 11:
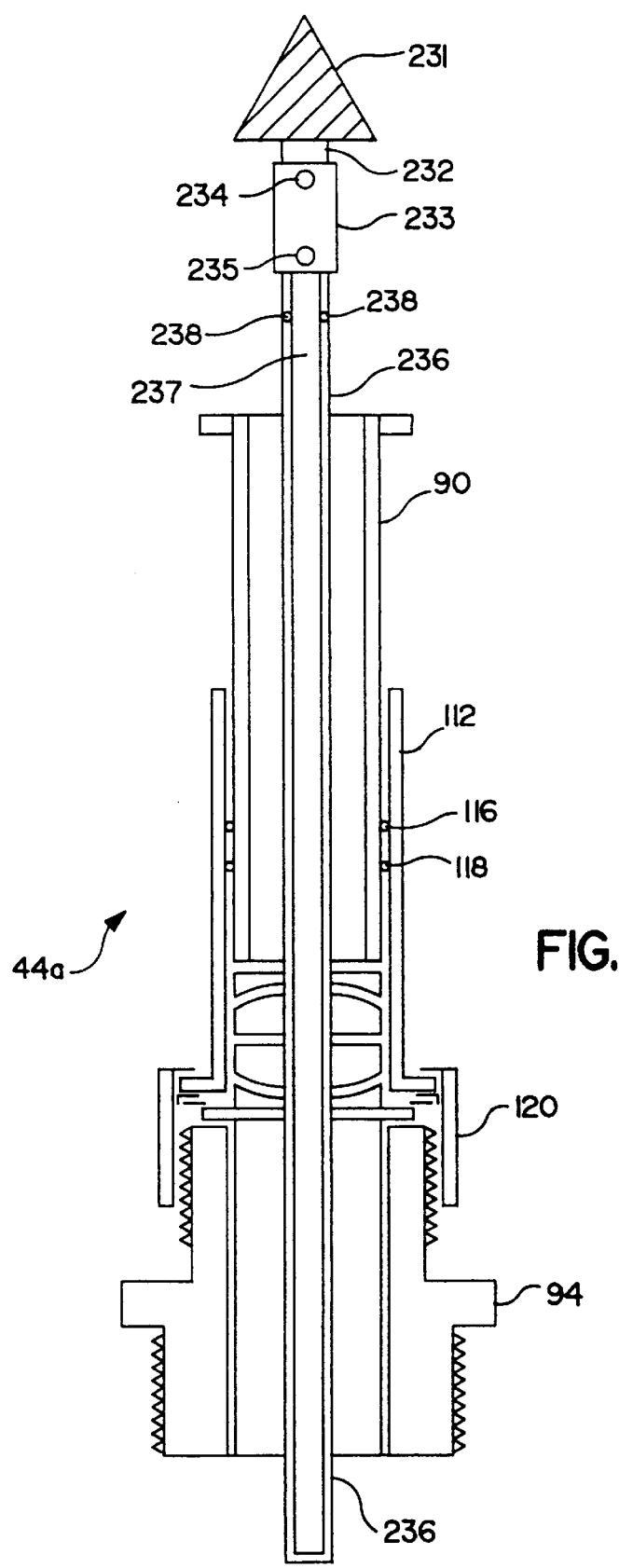
FIG. 11 is a drill assembly according to another embodiment of the present invention.

In certain circumstances, for example when the fluid in container 14 is highly viscous, it may be necessary to rinse the interior of container 14 to fully evacuate the viscous fluid therefrom. In another embodiment, the second drill assembly of FIGS. 6–8 is modified, as shown in FIG. 11, to provide a flushing feature during the processing of container 14. One possible configuration of fluid recovery system 10 according to this embodiment may incorporate first and second drill assemblies positioned below and above container 14 as described in connection with FIGS. 6–8. The first drill assembly is operable as described above to provide a conduit for withdrawal of the fluid from container 14 after container 14 is penetrated.

The second drill assembly 44a, preferably positioned above container 14, is modified in accordance with FIG. 11 to permit introduction of a flushing fluid from a remote source (not shown) into container 14 through second drill assembly 44a. Second drill assembly 44a is identical to first drill assembly 44 in many respects. Nevertheless, shaft 236 has an interior space 237 extending at least partly along the length of shaft 236. Connector 233 connects shaft 236 to drill bit 231. A plurality of orifices 238 are provided in shaft 236 to place interior space 237 in communication with the exterior of shaft 236.

In operation, container 14 is penetrated by first and second drill assemblies 44 and 44a. Fluid is thereby permitted to exit container 14 via first drill assembly 44 as described above. Fluid in a gaseous state may be permitted to exit second drill assembly 44a. Shaft 236 should be configured such that when second drill assembly 44a penetrates container 14, orifices 238 are positioned within container 14. To provide the flushing feature of this embodiment, an inert gas by be introduced into container 14 through shaft 236 to facilitate the removal of the fluid within container 14.

A liquid reagent, reactant, or water, heated water, steam or other flushing fluid may be injected through shaft 236 into container 14 to facilitate the removal of the fluid within container 14. Injection of the flushing fluid under pressure may add a mechanical jetting action to the flushing feature. Additionally, the flushing fluid may be injected into container 14 directionally. The flushing fluid and/or the outer surface of recovery vessel 12 may be heated to facilitate removal, for example by increasing the volatilization of the fluid within container 14.

According to an aspect of this embodiment, it may be desirable to flush interior 21 of recovery vessel 12. This may be accomplished by withdrawing second drill assembly 44a sufficiently to expose orifices 238 to interior 21. Fluids may then be removed through a suitable port formed in wall 43 of recovery vessel 12.

The contaminated fluids from the drill assembly or assemblies, the recovery vessel, or the container(s) within the vessel may be directed to any suitable processing system Although the present invention and its advantages have been described in detail, it should be understood that various changes, substitutions and alterations can be made herein without departing from the spirit and scope of the invention as defined by the appended claims.

What is claimed is:

1. In a cylinder rupture system comprising a sealable chamber having an opening in a wall thereof and a support for supporting a container therein, a drill assembly adapted to be attached to said cylinder rupture system for penetrating a wall of said container, said drill assembly comprising:

a tube adapted for lining a first opening into a sealable chamber, said tube extending from a position external to said sealable chamber to a position within said sealable chamber;

a housing having an interior and an exterior, said housing comprising a first port for allowing removal of contents from a container via the interior of said housing;

an assembly for connecting said housing to a first end of said tube and for partially defining a longitudinal bore, said assembly being integrally connected to said housing to form a seal between the interior and the exterior of said housing;

a shaft rotatably disposed within said longitudinal bore;

means connected to one end of said shaft for penetrating a wall of a container;

a motor engaged to another end of said shaft for rotating said shaft; and a seal assembly for forming a fluid barrier between the interior of said housing and said longitudinal bore.

2. The drill assembly of claim 1, wherein the integral connection between said assembly for connecting said housing and said housing is achieved by welding.

3. A drill assembly for penetrating a wall of a container comprising:

a tube adapted for lining a first opening;

a housing having an interior and an exterior, said housing comprising a port for allowing removal of the container contents via the interior of said housing;

an assembly for connecting said housing to a first end of said tube and for partially defining a longitudinal bore, said assembly being integrally connected to said housing to form a seal between the interior and the exterior of said housing;

a shaft rotatably disposed within said longitudinal bore;

means connected to one end of said shaft for penetrating a wall of a container;

a motor engaged to another end of said shaft for rotating said shaft; and a seal assembly for forming a fluid barrier between the interior of said housing and said longitudinal bore;

said assembly further comprising:

a sleeve for receiving said housing;

an adapter coupled at one end to said tube and at another end to said sleeve; and said seal assembly having one end engaging said sleeve and the other end engaging said adapter, such that said seal assembly, when compressed, forms a fluid barrier between the interior of said housing and said longitudinal bore.

4. The drill assembly of claim 3, wherein the integral connection between said assembly for connecting said housing and said housing is achieved by welding.

5. A drill assembly for penetrating a wall of a container comprising:

a tube adapted for lining a first opening;

a housing having an interior and an exterior, said housing comprising a port for allowing removal of the container contents via the interior of said housing;

an assembly for connecting said housing to a first end of said tube and for partially defining a longitudinal bore, said assembly being integrally connected to said housing to form a seal between the interior and the exterior of said housing;

a shaft rotatably disposed within said longitudinal bore;

means connected to one end of said shaft for penetrating a wall of a container;

a motor engaged to another end of said shaft for rotating said shaft; and a seal assembly for forming a fluid barrier between the interior of said housing and said longitudinal bore;

a first pressure detector in communication with said longitudinal bore for measuring a first pressure in said longitudinal bore;

a second pressure detector in communication with the interior of said housing for measuring a second pressure within the interior of said housing;

wherein when the second pressure decreases, a leak from the interior of said housing is indicated; and wherein when the second pressure decreases and the first pressure increases, a leak in said seal assembly is indicated.

6. A drill assembly for penetrating a wall of a container supported by a platform within a recovery vessel and allowing removal of container contents, comprising;

a tube adapted for lining a first opening into said recovery vessel, said tube extending from a position external to said recovery vessel to a position within said recovery vessel;

a housing having an interior and an exterior, said housing comprising a port for allowing removal of the container contents via the interior of said housing;

a coupling assembly for connecting said housing to a first end of said tube and for partially defining a longitudinal bore, said coupling assembly comprising an adapter connected to said tube and a sleeve for receiving a portion of said housing;

at least one O-ring disposed between said sleeve and said housing to form a seal between the interior and the exterior of said housing;

a shaft rotatably disposed within said longitudinal bore;

means connected to one end of said shaft for penetrating a wall of a container;

a motor engaged to another end of said shaft for rotating said shaft; and a seal assembly for forming a fluid barrier between the interior of said housing and said longitudinal bore.

7. A drill assembly for penetrating a wall of a container comprising:

a tube adapted for lining a first opening;

a housing having an interior and an exterior, said housing comprising a port for allowing removal of the container contents via the interior of said housing;

a coupling assembly for connecting said housing to a first end of said tube and for partially defining a longitudinal bore, said coupling assembly comprising an adapter connected to said tube and a sleeve for receiving a portion of said housing;

at least one O-ring disposed between said sleeve and said housing to form a seal between the interior and the exterior of said housing;

a shaft rotatably disposed within said longitudinal bore;

means connected to one end of said shaft for penetrating a wall of a container;

a motor engaged to another end of said shaft for rotating said shaft;

a seal assembly for forming a fluid barrier between the interior of said housing and said longitudinal bore; and said seal assembly having one end engaging said housing and the other end engaging said adapter, such that said seal assembly, when compressed, forms the fluid barrier between the interior of said housing and said longitudinal bore.

8. A drill assembly for penetrating a wall of a container comprising:

a tube adapted for lining a first opening;

a housing having an interior and an exterior, said housing comprising a port for allowing removal of the container contents via the interior of said housing;

a coupling assembly for connecting said housing to a first end of said tube and for partially defining a longitudinal bore, said coupling assembly comprising an adapter connected to said tube and a sleeve for receiving a portion of said housing;

at least one O-ring disposed between said sleeve and said housing to form a seal between the interior and the exterior of said housing;

a shaft rotatably disposed within said longitudinal bore;

means connected to one end of said shaft for penetrating the wall of the container;

a motor engaged to another end of said shaft for rotating said shaft;

a seal assembly for forming a fluid barrier between the interior of said housing and said longitudinal bore;

a first pressure detector in communication with said longitudinal bore for measuring a first pressure in said longitudinal bore;

a second pressure detector in communication with the interior of said housing for measuring a second pressure within the interior of said housing, wherein when the second pressure decreases, a leak from the interior of said housing is indicated; and wherein when the second pressure decreases and the first pressure increases, a leak in said seal assembly is indicated.

9. A drill assembly for penetrating a wall of a container supported by a platform within a recovery vessel and allowing removal of container contents, comprising:

a tube adapted for lining a first opening into said recovery vessel, said tube extending from a position external to said recovery vessel to a position within said recovery vessel;

a housing having an interior and an exterior, said housing comprising an end portion for abutting a wall of the container and forming at least two fluid seals therewith, and a port for allowing removal the container contents via the interior of said housing;

a coupling assembly for connecting said housing to a first end of said tube and for partially defining a longitudinal bore;

a shaft rotatably disposed within said longitudinal bore;

means connected to one end of said shaft for penetrating a wall of the container;

a motor engaged to the other end of said shaft for rotating said shaft; and a seal assembly for forming a fluid barrier between the interior of said housing and said longitudinal bore.

10. The drill assembly of claim 9, further comprising a washer disposed between said end portion and the wall of the container to form a first fluid seal, and at least one O-ring disposed between said end portion and the wall of the container to form a second fluid seal.

11. The drill assembly of claim 10, wherein when said means for penetrating penetrates a wall of a container, said first fluid seal is positioned between said means for penetrating and said second fluid seal.

12. A drill assembly for penetrating a wall of a container, comprising:

a tube adapted for lining a first opening;

a housing having an interior and an exterior, said housing comprising an end portion for abutting a wall of the container and forming at least two fluid seals therewith, and a port for allowing removal of the container contents via the interior of said housing;

a coupling assembly for connecting said housing to a first end of said tube and for partially defining a longitudinal bore;

a shaft rotatable disposed within said longitudinal bore;

means connected to one end of said shaft for penetrating a wall of a container;

a motor engaged to another end of said shaft for rotating said shaft;

a seal assembly for forming a fluid barrier between the interior of said housing and said longitudinal bore; and a washer disposed between said end portion and a wall of the container to form a first fluid seal, and a plurality of raised annular surfaces extending longitudinally from the end portion, said plurality of annular surfaces engaging said washer to form a second fluid seal.

13. A drill assembly for penetrating a wall of a container, comprising:

a tube adapted for lining a first opening;

a housing having an interior and an exterior, said housing comprising an end portion for abutting a wall of the container and forming at least two fluid seals therewith, and a port for allowing removal of the container contents via the interior of said housing;

a coupling assembly for connecting said housing to a first end of said tube and for partially defining a longitudinal bore;

a shaft rotatable disposed within said longitudinal bore;

means connected to one end of said shaft for penetrating a wall of a container;

a motor engaged to another end of said shaft for rotating said shaft;

a seal assembly for forming a fluid barrier between the interior of said housing and said longitudinal bore;

a first pressure detector in communication with said longitudinal bore for measuring a first pressure in said longitudinal bore;

a second pressure detector in communication with the interior of said housing for measuring a second pressure within the interior of said housing;

wherein when the second pressure decreases, a leak from the interior of said housing is indicated; and wherein when the second pressure decreases and the first pressure increases, a leak in said seal assembly is indicated.

14. The drill assembly of claim 1 further comprising:

a second port connected to a second end of said tube for allowing access to said longitudinal bore.

* * * * *